(12) United States Patent
Kulkarni (10) Patent No.: US 8,224,920 B1
(45) Date of Patent: Jul. 17, 2012

(54) METHOD FOR STORING AND ACCESSING DATA USING A SHELL INTERFACE

(75) Inventor: Raghavendra Kulkarni, West Hills, CA (US)

(73) Assignee: Pro Softnet Corporation, Calabasas, CA (US)

( * ) Notice: Subject to any disclaimer, the term of this patent is extended or adjusted under 35 U.S.C. 154(b) by 0 days.

(21) Appl. No.: 13/420,290

(22) Filed: Mar. 14, 2012

Related U.S. Application Data

(63) Continuation of application No. 13/315,265, filed on Dec. 8, 2011, which is a continuation of application No. 11/620,936, filed on Jan. 8, 2007, now Pat. No. 8,099,520.

(60) Provisional application No. 60/815,917, filed on Jun. 23, 2006.

(51) Int. Cl.
*G06F 15/16* (2006.01)
*G06F 15/177* (2006.01)
*G06Q 30/00* (2012.01)

(52) U.S. Cl. ........ 709/208; 709/220; 709/228; 709/247; 705/14.4; 705/14.49

(58) Field of Classification Search .................. 709/247, 709/208, 220, 228; 705/14.4, 14.49
See application file for complete search history.

(56) References Cited

U.S. PATENT DOCUMENTS

| | | | |
|---|---|---|---|
| 7,430,553 B2 * | 9/2008 | Howell et al. .......................... 1/1 |
| 2001/0051993 A1 * | 12/2001 | Shim .............................. 709/208 |
| 2002/0040405 A1 * | 4/2002 | Gold .............................. 709/231 |
| 2002/0174128 A1 * | 11/2002 | Govindarajan et al. ........ 707/100 |
| 2003/0229646 A1 * | 12/2003 | Bach et al. ................. 707/103 R |
| 2005/0289108 A1 * | 12/2005 | Carol et al. ......................... 707/1 |
| 2007/0265968 A1 * | 11/2007 | Kahn et al. ...................... 705/51 |

* cited by examiner

*Primary Examiner* — Phuoc Nguyen
*Assistant Examiner* — Clarence John
(74) *Attorney, Agent, or Firm* — Palak N Bhakta (57) ABSTRACT

This disclosure generally may disclose a web-based online network drive that may be utilized by many users. Furthermore, this disclosure may provide for an efficient, web-based file system, which may be available as a network drive on a local computer.

20 Claims, 5 Drawing Sheets

METHOD FOR STORING AND ACCESSING DATA USING A SHELL INTERFACE

CROSS REFERENCE TO RELATED APPLICATIONS

This application is a continuation application of U.S. patent application Ser. No. 13/315,265, entitled "Displaying Advertising Content in a Shell Interface," filed on Dec. 8, 2011, which is incorporated herein by reference. U.S. patent application Ser. No. 13/315,265 is a continuation application of U.S. patent application Ser. No. 11/620,936 now U.S. Pat. No. 8,099,520, entitled "System and Method for Storing and Accessing Data," filed on Jan. 8, 2007, which is incorporated herein by reference. U.S. patent application Ser. No. 11/620,936 claims priority to U.S. Provisional Application No. 60/815,917, filed Jun. 23, 2006.

FIELD

This disclosure generally may describe a web-based online network drive that may be used by many users. More specifically, this disclosure may provide for an efficient web-based file system, which may be available as a network drive on a local computer.

BACKGROUND

Systems and methods may have been used for some time for storing computer data files, for example, in a digital format. Computer data files have been stored in random access memory (RAM), punch cards, on tapes, diskettes, compact disks (CDs), flash memories and many other media. Today, large quantities of information may be stored in the form of computer data files. Storing information in computer data files may generally result in the information being easier to retrieve, and easier to search and manipulate using computers, and may require less storage space than other systems and methods for storing information.

Computer data files may be stored in a primary storage location, as well as in a remote storage location. Computer data files may be stored in a remote system to increase availability to various users, as well as increase memory storage capacity at individual client devices. Remote systems may include network and/or Internet-based drives and storage media.

There may be network drives that map a network shared data storage resource as a virtual hard disk, including CIFS/SMB based by Microsoft®/Samba Foundation®. Further network drives may have existed such as a web-based online network drive, which may be based on inefficient protocols such as WebDAV and FTP offered by Riverfront Technologies®. Wide spread utilization of the online network drive systems may not have taken place due to several drawbacks. The drawbacks may include slow performance of WebDAV and other protocols such as FTP, which may be used to implement the online network drive systems over the Internet and/or other networks. Another consideration may be the high cost of operating such services as it may involve multiple gigabytes of storage per user. Yet further considerations may include users having to spend a great deal of time in operating the online drive, and/or spending a significant amount of money to maintain such a system.

SUMMARY

This disclosure may provide for optimization of data transfer at many levels during online network drive operations. The time required to operate an application from the point of view of a client may be reduced. This disclosure may also describe customization of a mapped drive user interface, which may allow an advertisement based model that may allow advertisements to be displayed in available space of the drive data interface. Another embodiment of this disclosure may include a centralized web-based storage and/or peer-to-peer storage, or combinations thereof. This configuration may include data which may be stored in many locations on the web instead of only local and/or centrally managed storage.

Efficiency in transfers may be achieved by using wire compression, or other compression technique, for data transferred between the client computer and a storage location for initial block by block transfers. If the data already exists on the storage location, only the modified blocks may be transferred within a file. Furthermore, existing data may be cached on the client computer for immediate access. Further optimization may be achieved by accomplishing operations directly on stored files instead of downloading the entire file to the client computer. This may have great relevance for certain operations such as edits and saves on Microsoft® Access®—type files, among other file types. Further optimization may be achieved by creating a database of commonly stored user data such as, but not limited to, mp3 (music files), video files on server side, and copy or link from the storage to a user account upon verification that the user is attempting to transfer the same file from a local computer to a remote computer with a checksum method, among other verification techniques.

Furthermore, a shell interface approach may be used, which may provide flexibility in how space within the user interface may be utilized. A shell interface may be configured to generally resemble a drive/file/folder interface, and the largely empty right side of the interface space may be utilized to display content such as, but not limited to, advertisements, among other information. This may be different from the click based text, or rich text advertisements, on the web browser platform, as the shell interface may, in reality, be the drive/file/folder interface. Therefore, the Windows® platform itself may be utilized as an advertisement platform.

BRIEF DESCRIPTION OF THE DRAWINGS

The figures in this disclosure illustrate various embodiments, which may include part or all of the features shown in one of these figures, or may include features from two or more figures. Embodiments may also include features described in the specification, or limitations to features described in the specification. Furthermore, embodiments may include features that would be familiar to a person of ordinary skill in the art, having reviewed this disclosure.

DETAILED DESCRIPTION

Figure 1:
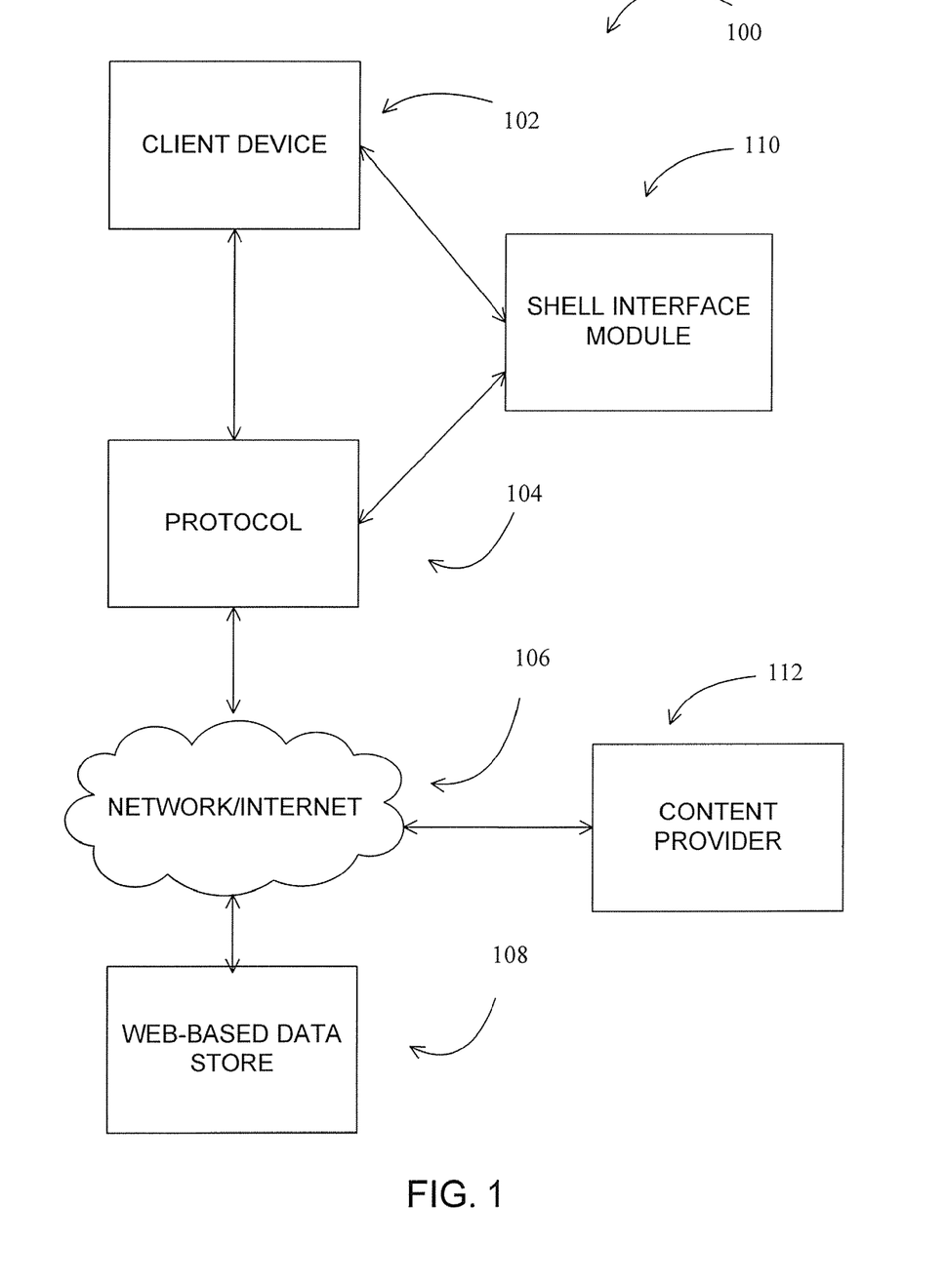
FIG. 1 is a block diagram illustrating various components of an embodiment of a data storing and accessing system.

This disclosure may include systems and methods of storing and accessing data. FIG. 1 is a block diagram illustrating various components of an embodiment of a data storing and accessing system 100. In one embodiment, system 100 may include a client device 102, coupled to a shell interface module 110. Client device 102 may also utilize protocol 104 and connect to a network/Internet 106. Internet 106 may be operatively coupled to web-based data store or storage 108, as well as content provider 112.

Client device 102 may include a computer, computing device, wireless device, and many other devices capable of coupling to shell interface module 110, as well as utilizing protocol 104 to connect to Internet 106. Client device 102 may include many devices, application programs, and/or modules such that it may be coupled to various networks, devices, and/or modules that may be capable of transmitting and receiving data.

Shell interface module 110 may be configured to resemble a drive/file/folder system such as, but not limited to, Microsoft® Explorer®, among many other drive/file/folder interfaces and/or systems.

Shell interface module 110 may reside on client device 102 or other devices, and may be initiated or stored at various locations and/or devices. Shell interface module 110 may be capable of receiving information from client device 102, such as user inputs, file and drive/file/folder information, as well as other information and/or data. Shell interface module 110 may also be capable of displaying web-based data store 108 as available drive/file/folder systems, such that a user may be unaware of the location of the files and folders from client device 102 and/or web-based data store 108. This configuration may allow web-based drives to appear as, and operate similarly to, local drives/folders/files to a user.

Shell interface module 110 may also be capable of utilizing protocol 104 to transmit and/or receive information from web-based data store 108 via Internet 106. Data transmitted and/or received from shell interface module 110 may be compressed to reduce access and transmitting/receiving times of data from web-based data store 108. This may allow a large amount of storage to be available to a user of client device 102, such that a user's storage and application program capability may be greatly enhanced.

Data transmitted and received from shell interface module 110 may be compressed via block-by-block compression, on-the-wire compression, and/or many other compression techniques that may allow data to be transmitted/received to and from shell interface module 110 at an increased speed, such that a user may not realize that drives/folders/files residing on web-based data store 108 are not local drives/folders/files. Furthermore, data transfer speed may be increased by transferring only modified blocks, as well as editing the data at web-based data store 108 without transferring the entire file to the client device 102 via shell interface module 110 for editing. These techniques may also reduce the amount of time for transferring/receiving data to and from shell interface module 110, thereby making web-based data store 108 more attractive to a user.

Further techniques that may be utilized to reduce data transfer times include caching of frequently used files/folders/documents such that a drive/folder/file/document may be readily available to a user without repeatedly downloading it or transmitting it from web-based data store 108 to the client device 102 via shell interface module 110. Frequently used data may also be linked to the user interface via a copy or link, which may be clicked on by a user. Locally cached data may also be compared to stored data for differences, and if there are no differences, the locally cached data may be utilized. This technique may further reduce data transfer time.

Web-based data store 108 may include a central data store and/or a peer-to-peer data store such that a vast amount of storage may be available to a user greatly exceeding the storage available on one single device and/or the client device.

Utilizing individual or combinations of these techniques may improve data transfer rates during on-line operations, and may significantly reduce the time required to operate an application. The shell interface module 110 may also be capable of customization of the mapped drive user interface, which may allow unused areas of the user interface to be utilized for advertisement-based purposes, among others. This advertisement based utilization may allow revenues to be created by selling unused and/or underused space to advertisers.

If shell interface module 110 is configured to resemble a common drive/file/folder system, there may be open space and/or real estate in various portions of the user interface. This space may be on the right (or left) half of the user interface as it appears to a user. Shell interface module 110 may also be capable of receiving content from content provider 112 that may be shown in areas of the user interface that may not have information displayed to a user. In this manner, content provided to the shell interface module 110 for viewing for display and viewing by a user may be advertising or other content, such that the cost of using web-based storage may be reduced to also make web-based storage attractive to a user. The content may include advertising content including links to various web-sites and/or services, among other data.

Figure 2:
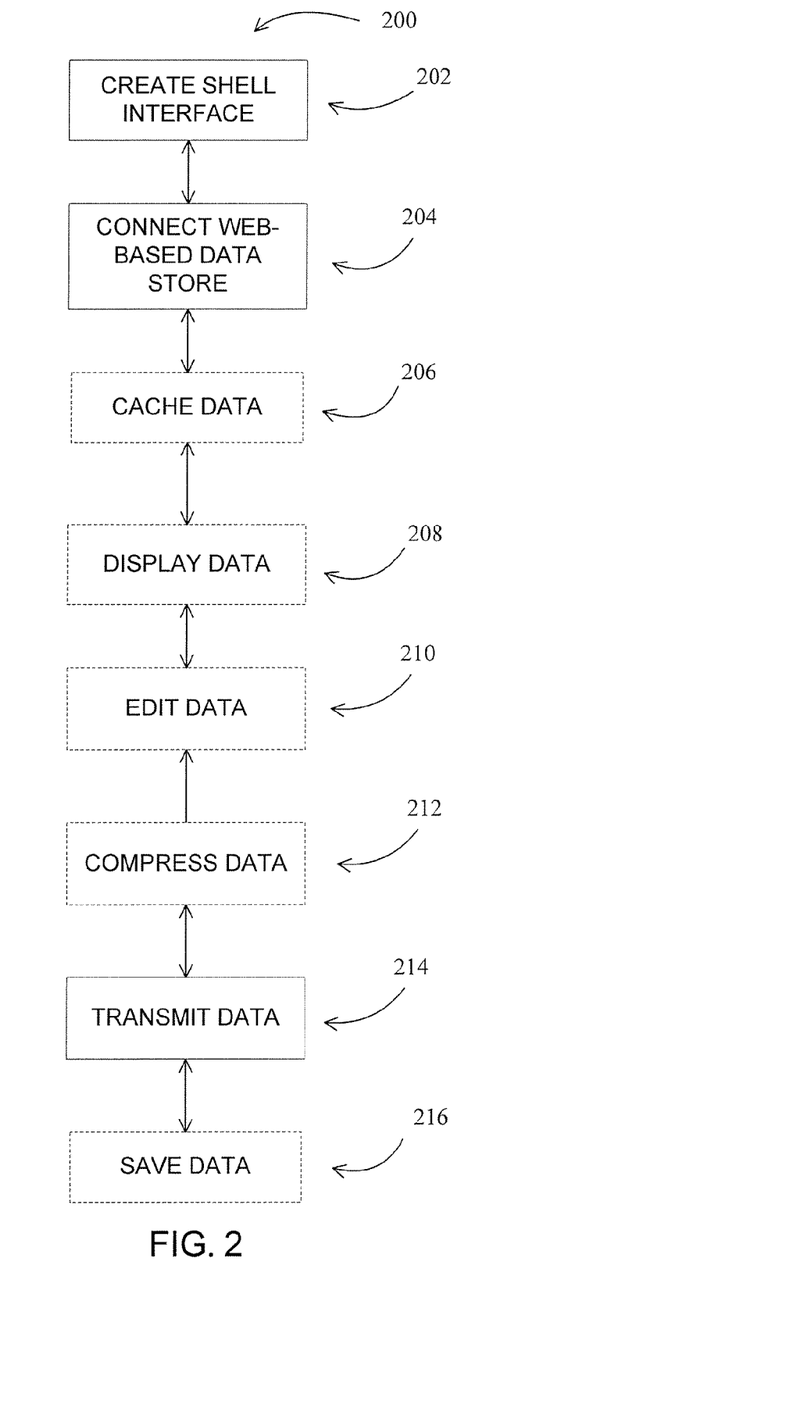
FIG. 2 is a flow chart illustrating an embodiment of a method of storing and accessing data.

FIG. 2 illustrates an embodiment of a method 200 which may be performed to manipulate data. The method shown in FIG. 2 may be performed by a computing device. Method 200 may include creating a shell interface 202. The shell interface may be created to be capable of transmitting and receiving information from a client device such as drive/file/folder information. The created shell interface 202 may also be capable of transmitting/receiving data via a protocol to and from a web-based data store and/or a content provider. A shell interface module 110 may be configured to resemble a drive/folder/file system such that web-based data store and client device drive/folder/file systems may appear as one system and/or may appear as local drives/folders/files.

Method 200 may also include connecting the web-based data store to a shell interface 204 such that information such as, but not limited to, drive/folder/file systems may be transmitted and received to and from a shell interface. The client device and/or the shell interface may be coupled to the network via a wired, wireless, and/or other technique, and/or combinations thereof. This may allow data including data files, information, and documents to be transmitted and received between the shell interface 110 and the web-based data store 108.

At 206 data may be cached. As indicated in FIG. 2 this action may be optional. Caching data regularly and/or frequently used by a user and or shell interface may decrease the time needed to transfer and/or present data and/or information to a user. This may further reduce time in utilization of the web-based data store such that a user may be more likely to utilize web-based data store and/or the user may not realize the web-based data store is remote and not local.

Data may be displayed at 208. As indicated in FIG. 2 this action may be optional. This data and/or information may include the drive/folder/file information and may also include the actual application programs, data files, and/or documents utilized by a user. At 210 data may be edited. As indicated in FIG. 2 this action may be optional. The user may edit/manipulate the data, such as a text file, picture file, or any other type of file.

The edited data may then be compressed at 212. Compression techniques that may be utilized may include, but are not limited to, a block-by-block compression, on-the-wire compression, and/or other compression techniques that may reduce the amount of time needed to transmit data to and from the shell interface module to and from the web-based storage, and/or combinations thereof. The data may be fully or partially compressed. Furthermore, the data may also be encrypted.

Data may then be transmitted at 214. The data to be transmitted may only be the modified blocks of data. Furthermore, the data to be edited may reside on a web-based data store such that the transmitted data may only include changes made to the information and/or data residing on a web-based data store.

Data may then be stored at 216 at web-based storage. As indicated in FIG. 2 this action may be optional. Web-based storage may include a central data store and/or a peer-to-peer data store such that a vast amount of storage may be available to a user greatly exceeding the storage available on one single device and/or the client device.

Figure 3:
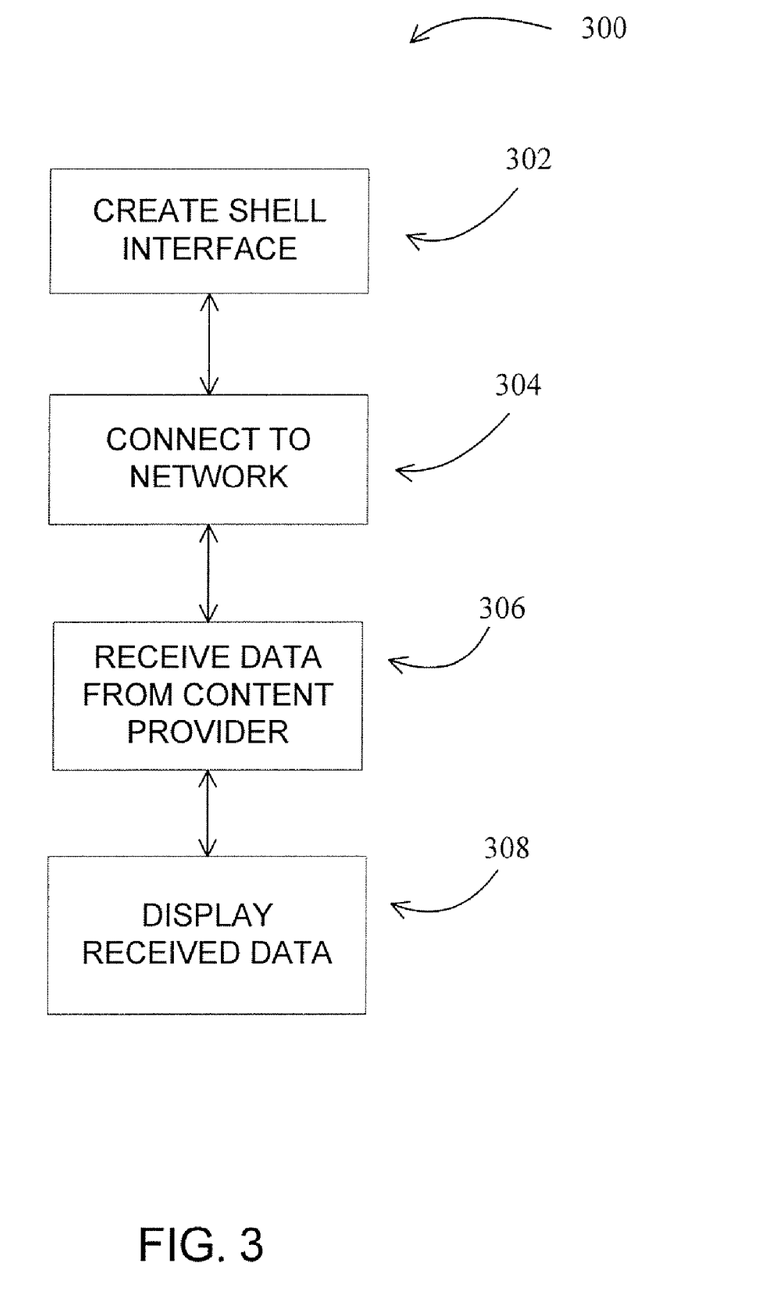
FIG. 3 is a flow chart illustrating an embodiment of a method of displaying data.

FIG. 3 illustrates an embodiment of a method 300 which may be performed to manipulate data. The method shown in FIG. 3 may be performed by a computing device. Method 300 may include creating a shell interface at 302. The shell interface may be capable of receiving and transmitting data to and from a client device as well as a web-based storage and/or a content provider.

Method 300 may include connecting to a network at 304. The shell interface may be further capable of connecting to a network/Internet such that the shell interface may be capable of transmitting and receiving data via the network to content providers.

Data may be received from a content provider at 306. This content may include, but is not limited to, advertising content that may be displayed on shell interface to a user in open areas, and/or other areas, of the shell interface. The content may include advertising content such as links to various websites and/or services, among other data.

The shell interface may be configured to resemble a drive/folder/file system. The content provided may be selected utilizing many parameters, including preferences of the user, advertising the user has indicated they may be interested in, other content provided by the provider and/or information or data the user is transmitting and receiving, among many other parameters.

The data received from the content provider may then be displayed to the user on the shell interface in areas predetermined or dynamically determined, depending on many parameters, including open space, priority of information and/or many other parameters. It would be appreciated that the parameters for the content and location of the data received from the content provider may be based, at least in part, on many different considerations, without straying from the spirit and scope of this disclosure.

Figure 4:
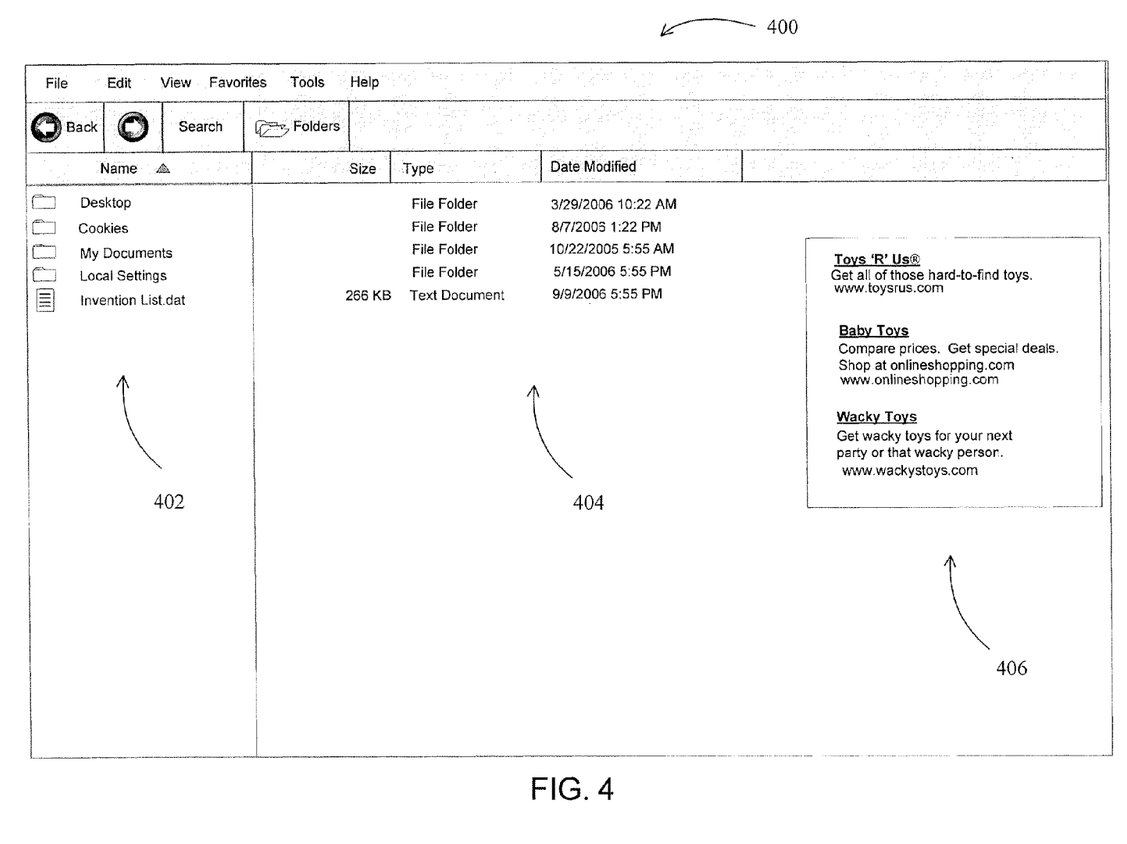
FIG. 4 illustrates an embodiment of a shell interface illustrating drives/files/folders and other information that may be displayed.

FIG. 4 illustrates an embodiment of a shell interface generally at 400. The shell interface may include a drive/file portion 402, an information portion 404, as well as a provided content portion 406. As shown, the drive/folder/file system may generally resemble a Windows® Explorer®-type interface, and/or other drive/folder/file interface. Furthermore, in this embodiment, the right area of the interface may have an unused area and/or open real estate. This area may be utilized to display content to a user. This content may include advertising, such as the advertising shown in the content portion 406. Advertisers and/or content providers may reduce the cost of utilization of the web-based drive, such that the web-based storage may be free or available at a nominal amount, which may make it more likely that a user may utilize web-based storage.

The drives/folders/files shown in drive/file portion may include local, and/or non-local drive/folder/file information, such as, but not limited to, drives/folders/files at a remote, and/or non-local data store.

The content may be configured as advertisement pages which may be locally cached in the client device. The content may be periodically synched with the content provider. If the data store contents are shown generally in a drive/folder/file format, a large portion of the user interface area may be modified according to content provider requirements. An HTML window may be created generally in unused portions of the user interface, preferably, generally near the right hand side, which may be configured to display advertisements pages. Whenever a user browses data store contents in an Explorer®-type window, the HTML window containing advertisement may be shown in without abstracting the view of the drive/folder/file layout. If the user is interested in the advertisement, they can open it by clicking on the link, which may take them to a particular website. Content may be common to all users, i.e., not user specific, and/or user specific, and/or combinations thereof.

Figure 5:
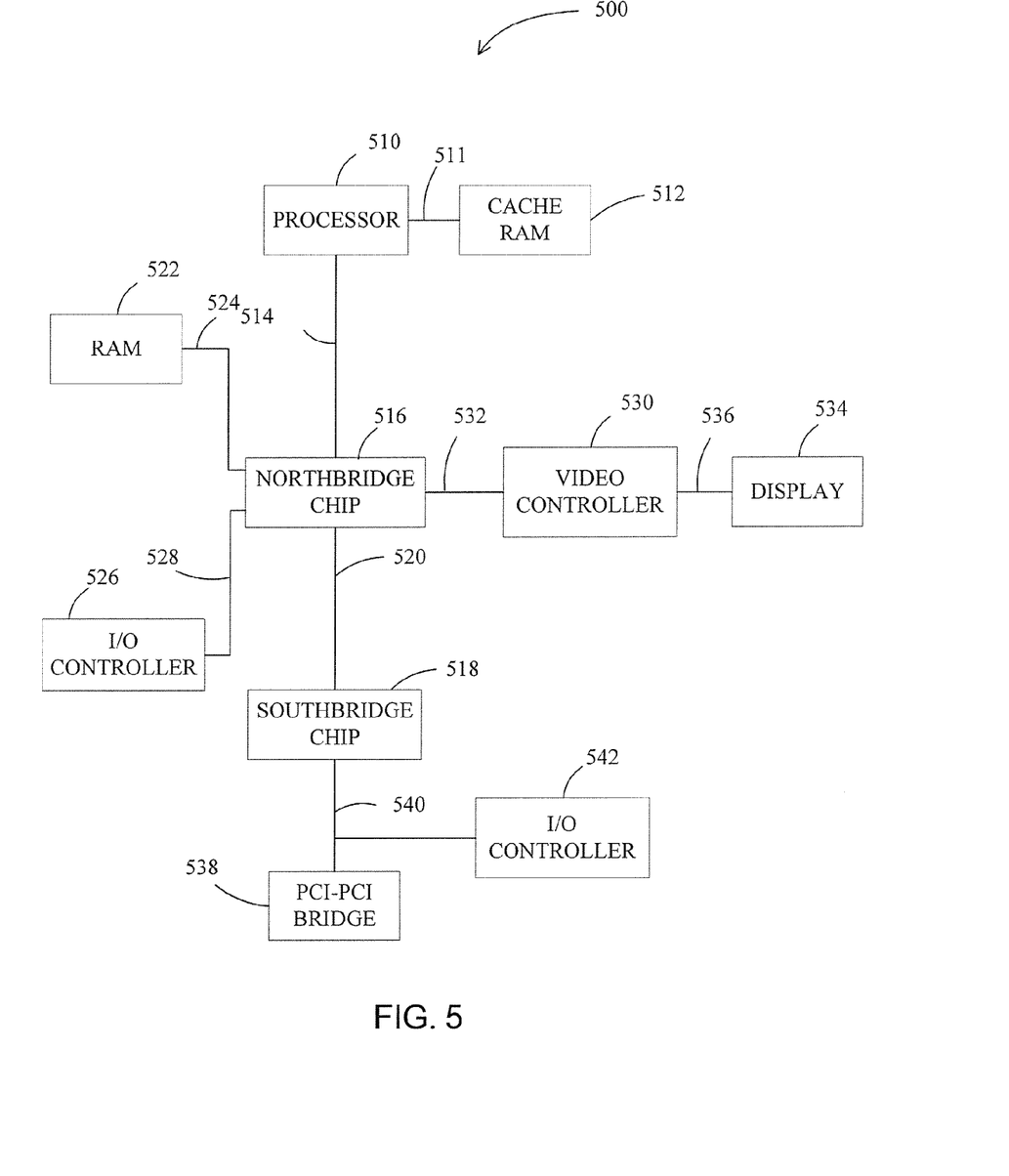
FIG. 5 is a block diagram of illustrating various components of an embodiment of a computing platform capable of executing data manipulation.

Referring now to FIG. 5, a block diagram of a computing platform capable of executing manipulation of data in accordance with one or more embodiments will be discussed. It should be noted that computing platform 500 of FIG. 5 is merely one type of computing platform, and other computing platforms having more or fewer components than shown in FIG. 5 may be implemented, and the scope of claimed subject matter is not limited in this respect. In one or more embodiments, computing platform 500 may be utilized to implement method 200 and/or method 300 in whole or using more and/or fewer blocks than shown in FIG. 2 and FIG. 3, and the scope of claimed subject matter is not limited in this respect. Computing platform 500 may include processor 510 coupled to cache random access memory (RAM) 512 via back side bus 511. Processor 510 may also be coupled to a chipset that includes Northbridge chip 516 via front side bus 514, and also to Southbridge chip 518 via bus 520. In one embodiment, Northbridge chip 516 in general may be utilized to connect a processor to memory, to an input/output bus, to a video bus, and to Level 2 cache, although the scope of claimed subject matter is not limited in this respect.

Southbridge chip 518 may be utilized to control input/output functions, the basic input/out system (BIOS), an interrupt control functions of Integrated Drive Electronics (IDE) devices such as hard disks or compact disk-read only memory (CD-ROM) devices or the like, although the scope of claimed subject matter is not limited in this respect. Random access memory (RAM) 522 may couple to Northbridge chip 516 via main memory bus 524, and input/output (I/O) controller 526 may also couple to Northbridge chip 516 via I/O bus 528. In one embodiment, I/O controller 526 and I/O bus 528 may be in compliance with a Small Computer Systems Interface (SCSI) specification such as the American National Standards Institute (ANSI) X3.131-1994 SCSI-2 specification, although the scope of claimed subject matter is not limited in this respect. In an alternative embodiment, I/O controller 526 and I/O bus 528 may be in compliance with a Peripheral Component Interconnect (PCI) bus, although the scope of claimed subject matter is not limited in this respect.

Video controller 530 may couple to Northbridge chip 516 via video bus 532, which in one embodiment may comprise an Accelerated Graphics Port (AGP) bus, although the scope of claimed subject matter is not limited in this respect. Video controller 530 may provide video signals to an optionally coupled display 534 via display interface 536 which in one embodiment may comprise a Digital Visual Interface (DVI) in compliance with a standard promulgated by the Digital Display Working Group, although the scope of claimed subject matter is not limited in this respect. Southbridge chip 518 may couple to a peripheral component interconnect to peripheral component interconnect (PCI-PCI) bridge 538 via input/output bus 540, which may in turn couple to I/O controller 542 to control various peripheral devices such as Universal Serial Bus (USB) devices, or devices compatible with an Institute of Electrical and Electronics Engineers (IEEE) 1394 specification, although the scope of claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to data storing and retrieval and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used in this document, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described in this document is required for the practice of the invention unless expressly described as "essential" or "critical".

In addition, modifications may be made to the disclosed embodiments without departing from the scope of the disclosure. The scope of this disclosure is therefore not limited to the disclosed embodiments, but is defined by the appended claims. In other words, other variations and modifications of embodiments will be apparent to those of ordinary skill in the art, and it is the intent of the appended claims that such variations and modifications be covered. The particular values and configurations discussed above can be varied, are cited to illustrate particular embodiments, and are not intended to limit the scope of this disclosure. It is contemplated that the implementation of the disclosed embodiments may involve components having different characteristics as long as the elements of at least one of the claims below, or the equivalents thereof, are included.

What is claimed is:

1. A method comprising:
    providing a shell interface configured to transmit information between a client computing device and a web-based data store, wherein the web-based data store comprises at least one database of commonly stored user data, each database containing different categories of files;
    allowing a connection to be established between the web-based data store and the shell interface;
    sending a data file from the web-based data store to the shell interface, the data file comprising blocks of data;
    configuring the shell interface to detect one or more manipulated blocks of data in the data file, wherein at least one or more different blocks of data in the data file are not manipulated;
    configuring the shell interface to compress the manipulated blocks of data, wherein the manipulated blocks of data are compressed at least in part block by block;
    receiving only the compressed manipulated blocks of data at the web-based data store from the shell interface, at least in part via the Internet; and
    associating the manipulated blocks of data to corresponding blocks of data at the web-based data store.

2. The method of claim 1, further comprising configuring the shell interface to cache the data file on the client computing device.

3. The method of claim 1, further comprising configuring the shell interface to appear similar to a folder/file interface.

4. The method of claim 1, further comprising configuring the shell interface to receive content from a content provider, wherein the content comprises advertising information to be displayed by the shell interface.

5. The method of claim 1, further comprising editing the data file with the manipulated blocks of data at the web-based data store.

6. The method of claim 1 wherein the database of commonly stored user data is for verifying whether a user is attempting to transfer, from the client computing device to the web-based data store, a data file that already resides at the web-based data store.

7. The method of claim 6 wherein the verifying is done using a checksum method.

8. A method comprising:
    providing a web-based data store, wherein the web-based data store comprises at least one database of verification data, each database of verification data corresponding to different categories of commonly stored data files;
    providing a client application for a client computing device, wherein the client application is configured to:
        create a shell interface on the client computing device;
        connect to the web-based data store over the Internet;
        transmit data between the client computing device and the web-based data store;
        receive a data file from the web-based data store, wherein the data file comprises blocks of data;
        detect one or more modified blocks of data in the data file, wherein at least one or more different blocks of data in the data file are not modified;
        compress the modified blocks of data, wherein the modified blocks of data are compressed at least in part block by block; and
        transmit the compressed modified blocks of data to the web-based data store, at least in part via the Internet;
    receiving the compressed modified blocks of data at the web-based data store; and
    associating the modified blocks of data to corresponding blocks of data at the web-based data store.

9. The method of claim 8, wherein the client application is further configured to be displayed to resemble a file/folder interface of an operating system on the client computing device.

10. The method of claim 8, wherein the client application is further configured to display advertising content.

11. The method of claim 8, wherein the client application is further configured to cache client data files located at the web-based data store on the client computing device.

12. The method of claim 8, further comprising encrypting the data file and the modified blocks of data.

13. The method of claim 8 wherein the client application is provided to an end user via the Internet.

14. The method of claim 8 wherein the web-based data store is a peer-to-peer data store.

15. A hardware implemented computer readable storage medium having instructions embodied on it that, if executed by a computing platform, perform the method comprising:
   creating a shell interface configured to transmit information between a client computing device and a web-based data store, wherein the web-based data store comprises at least one database of commonly stored user data, each database containing different categories of files;
   connecting the shell interface to the web-based data store;
   receiving a data file from the web-based data store at the shell interface, the data file comprising blocks of data;
   detecting one or more manipulated blocks of data in the data file, wherein at least one or more different blocks of data in the data file are not manipulated;
   compressing the manipulated blocks of data, wherein the manipulated blocks of data are compressed at least in part block by block;
   transmitting the compressed manipulated blocks of data to the web-based data store, at least in part via the Internet; and
   transmitting block level information of the data file to the web-based data store, wherein the block level information is used by the web-based data store to implement the manipulated blocks of data to corresponding blocks of data.

16. The computer readable medium of claim 15, further comprising instructions for transmitting one or more of user preference data, user data file information, and client computing device information to a content provider.

17. The computer readable medium of claim 16, further comprising instructions for:
   receiving advertising content from the content provider; and
   displaying the advertising content in unoccupied space of the shell interface.

18. The computer readable medium of claim 15, further comprising instructions for caching the data file on the client computing device.

19. The computer readable medium of claim 15, further comprising instructions for displaying the shell interface as a native file/folder on the client computing device.

20. The computer readable medium of claim 15, further comprising instructions for:
   verifying whether a user is attempting to transfer a user data file that already resides at the web-based data store; and
   linking, upon verification that the user data file already resides at web-based data store, a same user data file to a user account of the user.

\* \* \* \* \*